US011004319B2

United States Patent
Schieltz et al.

(10) Patent No.: US 11,004,319 B2
(45) Date of Patent: May 11, 2021

(54) SECURITY CAMERA SYSTEMS AND METHODS

(71) Applicant: SENSORMATIC ELECTRONICS, LLC, Boca Raton, FL (US)

(72) Inventors: Steven W. Schieltz, Boca Raton, FL (US); Dearles Rodriguez, Delray Beach, FL (US); Elwyn T. Ainsworth, Delray Beach, FL (US)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 0 days.

(21) Appl. No.: 16/513,242

(22) Filed: Jul. 16, 2019

(65) Prior Publication Data

US 2021/0020006 A1 Jan. 21, 2021

(51) Int. Cl.
| | | |
|---|---|---|
| *G08B 13/19* | (2006.01) | |
| *G08B 13/196* | (2006.01) | |
| *H04W 12/08* | (2021.01) | |
| *H04N 5/765* | (2006.01) | |
| *H04W 76/10* | (2018.01) | |
| *H04W 28/18* | (2009.01) | |
| *H04W 4/80* | (2018.01) | |
| *H04W 12/069* | (2021.01) | |

(52) U.S. Cl.
CPC ... *G08B 13/19684* (2013.01); *G08B 13/1966* (2013.01); *H04N 5/765* (2013.01); *H04W 4/80* (2018.02); *H04W 12/069* (2021.01); *H04W 12/08* (2013.01); *H04W 28/18* (2013.01); *H04W 76/10* (2018.02)

(58) Field of Classification Search
CPC .......................... G08B 13/19684; H04W 4/80
See application file for complete search history.

(56) References Cited

U.S. PATENT DOCUMENTS

| | | | |
|---|---|---|---|
| 2012/0044354 A1* | 2/2012 | Cheng | H04N 5/23203 348/159 |
| 2016/0147211 A1* | 5/2016 | Kore | H04W 4/80 700/83 |

FOREIGN PATENT DOCUMENTS

WO WO-2013033999 A1 * 3/2013 ............ H04W 8/005

* cited by examiner

*Primary Examiner* — Girumsew Wendmagegn
(74) *Attorney, Agent, or Firm* — Arent Fox LLP

(57) ABSTRACT

Aspects of the present disclosure include methods, apparatus, and systems for configuring a security camera including establishing a first connection between the dongle and the security camera through a communication port of the dongle, establishing a second connection with a mobile device, transmitting a request to the mobile device via the second connection, receiving, in response to the request, a configuration credential from the mobile device via the second connection, wherein the configuration credential is provided by the mobile device without disclosing the configuration credential to an operator of the mobile device, transmitting, via the first connection, the configuration credential to the security camera, receiving, in response to providing the configuration credential, a video stream from the security camera via the first connection, and transmitting, via the second connection, the video stream to the mobile device.

20 Claims, 6 Drawing Sheets

SECURITY CAMERA SYSTEMS AND METHODS

BACKGROUND

Security camera buyers, installers, and users may desire cameras that feature ease of installation and security, but still offer dynamic user customizations. Allowing full camera configuration accessible via a network connection may not provide the flexibility in system connections, configurations, and support for certain types of systems, but may introduce security threats such as malicious programs applications, interception of video, spoofing, and/or other threats.

Therefore, it may be desirable to manually install and configure the security cameras prior to connecting the security cameras to the network. However, at installation, a standard TV monitor maybe be connected to the cameras output to align where the camera is pointing and make image adjustments. It may be inconvenient to connect each camera to the standard TV monitor during installation and/or alignment.

Further, manual configuration of the security cameras may require the network administrator to provide configuration credentials, e.g., logins/passwords, digital keys, or other credentials to control access, to the installers to gain access the security cameras. However, providing the configuration credentials to the installers may pose a security risk because the installers may misplace the credentials, inadvertently or deliberately share the credentials with unauthorized personnel, and/or use the credentials without authorization from the network administrator and/or owner of the security cameras.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

Certain aspects of the present disclosure may include configuring a security camera including establishing a first connection between the dongle and the security camera through a communication port of a dongle, establishing a second connection between the dongle and a mobile device, transmitting a request to the mobile device via the second connection, receiving, in response to the request, a configuration credential from the mobile device via the second connection, wherein the configuration credential is provided by the mobile device without disclosing the configuration credential to an operator of the mobile device, transmitting, via the first connection, the configuration credential to the security camera, receiving, in response to providing the configuration credential, a video stream from the security camera via the first connection, and transmitting, via the second connection, the video stream to the mobile device.

Some aspects of the present disclosure may include a dongle for configuring a security camera including a memory and a processor communicatively coupled with the memory, the processor configured to establish a first connection between the dongle and a security camera through a communication port of the dongle, establish a second connection between the dongle and a mobile device, transmit a request to the mobile device via the second connection, receive, in response to the request, a configuration credential from the mobile device via the second connection, wherein the configuration credential is provided by the mobile device without disclosing the configuration credential to an operator of the mobile device, transmit, via the first connection, the configuration credential to the security camera, receive, in response to providing the configuration credential, a video stream from the security camera via the first connection, and transmit, via the second connection, the video stream to the mobile device.

An aspect of the present disclosure includes a non-transitory computer readable medium having instructions stored therein that, when executed by a processor of a dongle, cause the processor to establish a first connection between the dongle and a security camera through a communication port of the dongle, establish a second connection between the dongle and a mobile device, transmit a request to the mobile device via the second connection, receive, in response to the request, a configuration credential from the mobile device via the second connection, wherein the configuration credential is provided by the mobile device without disclosing the configuration credential to an operator of the mobile device, transmit, via the first connection, the configuration credential to the security camera, receive, in response to providing the configuration credential, a video stream from the security camera via the first connection, and transmit, via the second connection, the video stream to the mobile device.

An aspect of the present disclosure includes a method for operating a security camera in command mode including receiving a first command from a plurality of commands, executing the first command, receiving a second command from a plurality of commands, and refraining from executing the second command, wherein the first command is in a first list of allowed commands and the second command is in a second list of forbidden commands.

In some aspects, a security camera may include a memory and a processor communicatively coupled with the memory, the processor being configured to receive a first command from a plurality of commands, execute the first command, receive a second command from a plurality of commands, and refrain from executing the second command, wherein the first command is in a first list of allowed commands and the second command is in a second list of forbidden commands.

Some aspects of the present disclosure includes a non-transitory computer readable medium having instructions stored therein that, when executed by a processor of a security camera, cause the processor to receive a first command from a plurality of commands, execute the first command, receive a second command from a plurality of commands, and refrain from executing the second command, wherein the first command is in a first list of allowed commands and the second command is in a second list of forbidden commands.

In one aspect, a method of configuring a security camera using a dongle includes establishing a first connection between the dongle and the security camera through a communication port of the dongle, establishing a second connection between the dongle and a mobile device, allowing the mobile device user interface to log on and configure the camera, transmitting a video stream from the security camera via the first connection and second connection to the mobile device.

In other aspects of the present disclosure, a method of configuring a security camera using a dongle includes establishing a first connection between the dongle and the security camera through a communication port of the dongle, establishing a second connection between the dongle and a mobile device, receiving configuration commands from the mobile device, transmitting the configuration commands to the security camera, receiving a video stream from the security camera via the first connection and, transmitting the video stream via second connection to the mobile device.

BRIEF DESCRIPTION OF THE DRAWINGS

The features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advantages thereof, will be best understood by reference to the following detailed description of illustrative aspects of the disclosure when read in conjunction with the accompanying drawings, wherein:

DETAILED DESCRIPTION

Figure 1:
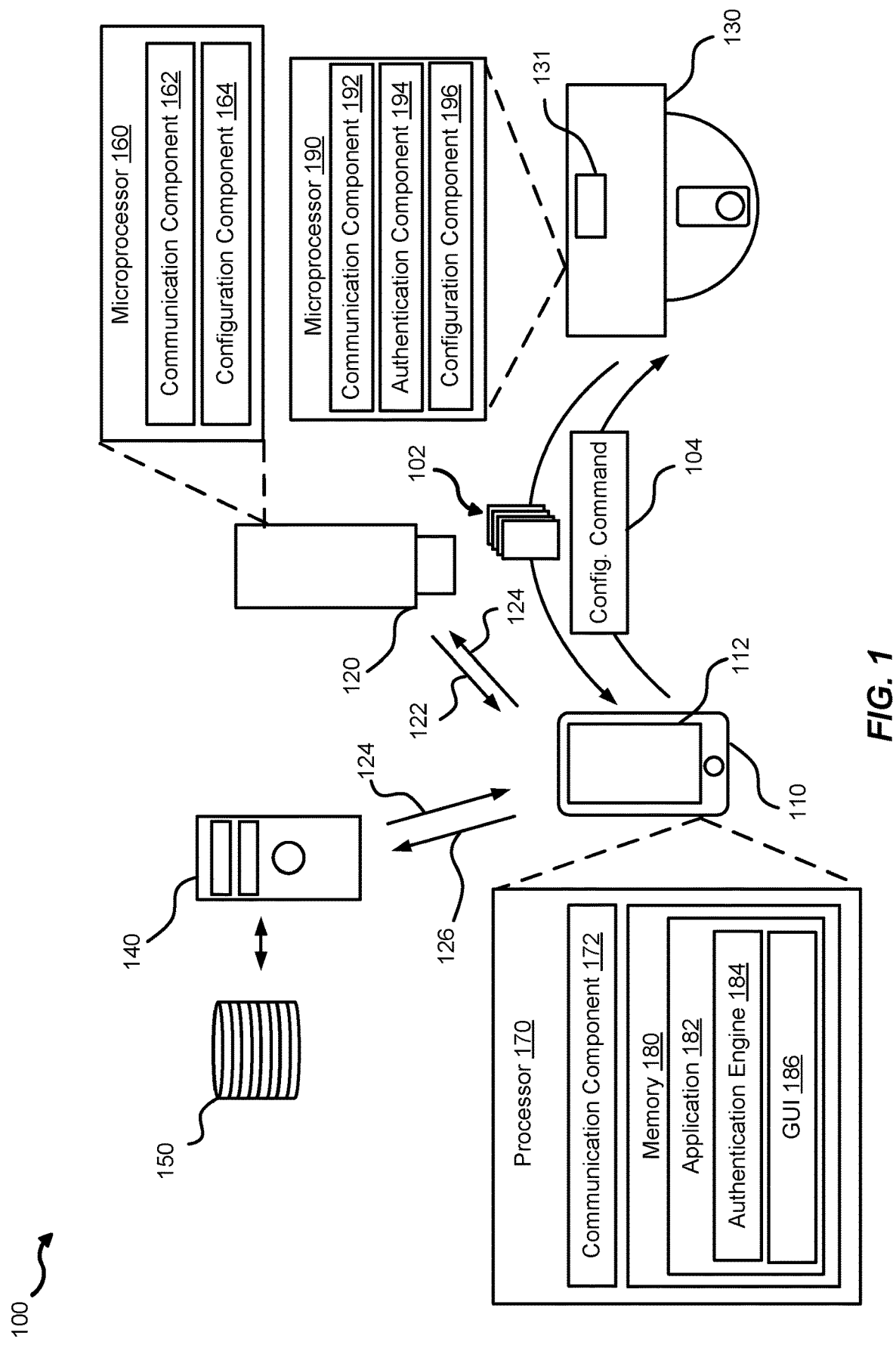
FIG. 1 illustrates an example of an environment for configuring a security camera in accordance with aspects of the present disclosure.

Aspects of the present disclosure may provide functions for security cameras, which improve installation and security, as well as usability at the same time, by providing tools for simple and secure installation, and allowing camera enumeration and display of user required functions. At the same time locking out other configuration options thus preventing security breaches. For example, a mobile phone may display the objects viewed by the camera for easy installation alignment of the field of view. The installation of the cameras may be achieved without the physical installation personnel ever knowing the security credentials. Certain aspects may limit and/or prevent camera data reception, thus providing plug and play connection and cyber security.

In some aspects, a dongle may plug into the camera secure digital (SD) card or universal serial bus (USB) slot and establish a WiFi connection to installer's mobile device. An application running on the phone provides the camera video. This allows an installer to see where the camera is pointing and adjust pan, tilt, zoom (e.g., vari-focal), and focus if required before completing the install. The pan, tilt, and possibly zoom may require manual adjustment. The manual adjustments may need to be completed during the installation before removing any ladder or lift mechanism.

The application may be designed to install security credentials (e.g., user ID and password) into the camera so the system controlling network video recorder (NVR) may control the camera during and after installation.

A security feature may include using the dongle and/or the application to prevent the installer from knowing the credentials of the camera to complete the install. This may be accomplished by having the credentials encrypted and stored in the application on a mobile device by the administrator or system-commissioning officer and/or by having the credentials supplied by a secure cloud based service. This may be done by using a public/private encryption scheme where the credentials are encrypted using a public key, and the camera software uses the matching private key to decrypt and install them.

Once the camera is installed and loaded with the credentials, it may be added and commissioned into the NVR system. At that point the dongle can be locked out or alternately allowed access to view or reposition the camera.

For added ease of installation, the dongle may have an enclosed near field communication (NFC) smart tag to instantly configure the WiFi and launch the application on an NFC capable mobile phone or tablet device that is presented by physically bringing the phone or tablet close to the NFC tag on the dongle.

The system may use multicast or single cast to fixed internet protocol (IP) address with virtual IP addresses for a point-to-point link. A smart switch or recorder may use the physical port to identify the camera number. A smart internet protocol (IP) switch, hub, or digital video recorder (DVR) may receive multiple streams from multiple cameras having one dedicated port for each camera. The device will increment or translate the fixed IP address for use or forwarding. This allows any camera plugged into any port to assume that port number thus simplifying installation, and troubleshooting, as swapping cable connections will swap cameras to determine if a fault is with the camera or the port Turning now to FIG. 1, an example of an environment 100 for installing and operating one or more security cameras may include a mobile device 110 having a display 112. The environment 100 may include a dongle 120 configured to provide one or more video streams 102 from a security camera 130 to the mobile device 110. The environment 100 may include a NVR system 140 that operates and/or monitors the security camera 130.

In some implementations, the mobile device 110 may include a mobile phone, a tablet computer, a personal digital assistant, a wireless phone, a wireless device, a handheld device, a laptop computer, or other portable electronic devices capable of communicating with the camera and/or displaying a video stream. The mobile device 110 may include a processor 170 having a communication component 172 that may communicate with the dongle 120, the NVR system 140, and/or the security camera 130. For example, the mobile device 110 may utilize the communication component 172 to transmit and/or receive data from the dongle 120. The mobile device 110 may include an application 182 stored in a memory 180. When the instructions of the application 182 are executed by the processor 170, an authentication engine 184 may authenticate an authentication request transmitted from the dongle 130. When the instructions of the application 182 is executed by the processor 170, a graphical user interface (GUI) 186 may display the video stream from the security camera 130 on the display 112.

In some implementations the display 112 may be a touch-sensitive display, a liquid crystal display, an active matrix display, an organic light emitting diode display, and/or a reflective display or any other display capable of displaying a video stream.

In certain aspects, the dongle 120 may include a microprocessor 160. The microprocessor 160 may include one or more central processing units (CPUs), a system on chip, a microcontroller, a field programmable gate array, a programmable gate array, or any integrated circuit configured to execute logical operations. The microprocessor 160 may include a communication component 162 configured to communicate with the mobile device 110 and/or the security camera 130. The microprocessor 160 may include a connection component 164 that configures communication protocols used to communicate with the mobile device 110 and/or the security camera 130.

In some examples, the security camera 130 may include a pan-zoom-tilt (PZT) camera, a digital camera, a closed-circuit camera, or other suitable detectors/sensors capable of monitoring an area. The security camera 130 may be configured to detect infra-red radiations. The security camera 130 may be a wired or wireless camera. The security camera 130 may include a microprocessor 190. The microprocessor 190 may include one or more central processing units (CPUs), a system on chip, a microcontroller, a field programmable gate array, a programmable gate array, or any integrated circuit configured to execute logical operations. The microprocessor 190 may include a communication component 192 configured to communicate with the dongle 120. The microprocessor 190 may include an authentication component 194 configured to allow the dongle 120 to configure the security camera 130 and/or transmit video stream upon receiving a valid configuration credential from the dongle 120. The microprocessor 190 may include a configuration component 196 that configures the security camera 130 (e.g., zoom, pan, tilt, resolution, contrast, mode of operation, etc.)

In a non-limiting example, the NVR system 140 may include a server and/or an optional data repository 150 that stores security feeds. The NVR system 140 may receive security video streams from the security camera 130 during operation. The security video streams may be stored in the data repository 150. The security video streams may be monitored in real time and/or non-real-time by security personnel, network administrators, etc.

During the installation process of the security camera 130, an installer (not shown) may be coupled with the dongle 120 with the security camera 130. In some examples, the installer may be coupled with the dongle 120 with a port 131 (e.g., the Universal Serial Bus (USB) port or the Micro Secure Digital (MicroSD) slot) of the security camera 130. After the coupling, the installer may be wirelessly coupled with the dongle 120 and the mobile device 110. In one example, the installer may pair the dongle 120 and the mobile device 110 using near field communication (NFC). After the pairing, the communication component 172 of the mobile device 110 may transmit connection configuration information to the dongle 120. The connection component 164 of the dongle 120 may configure the wireless communication configurations (e.g., Wireless Fidelity (WiFi) configuration) to establish wireless connection between the dongle 120 and the mobile device 110. In another implementation, the dongle 120 may be coupled with to the mobile device 110 via a WiFi-direct connection, Blutooth™ connection, NFC connection, or other wireless and/or wired connections that communicatively coupled the dongle 120 with the mobile device 110.

In some instances, the dongle 120 may transmit an authentication request 122 to the mobile device 110 to request for a configuration credential 124 (e.g., digital private key, login/password) for accessing the security camera 130. The authentication request 122 may optionally include an identifier associated with the security camera 130. Upon receiving the authentication request 122 at the mobile device 110, the authentication engine 184 may determine if the authentication request 122 is valid. For example, the authentication engine 184 may generate a credential request 126 for the NVR system 140 for the configuration credential 124 used to configure the security camera 130. The communication component 172 of the mobile device 110 may transmit the credential request 126 to the NVR system 140. The credential request 126 may optionally include the identifier associated with the security camera 130 to indicate that the dongle 120 is attempting to configure the security camera 130. The NVR system 140 may transmit the configuration credential 124 to the communication component 172 of the mobile device 110. Upon receiving the configuration credential 124, the communication component 172, in response to receiving the authentication request 122, may transmit the configuration credential 124 to the dongle 120.

In certain implementation, the dongle 120 may transmit a request to the mobile device 110 to request for the configuration credential 124. The request may not be authenticated by the mobile device 110. Upon receiving the request, the communication component 172 of the mobile device 110 may transmit the credential request 126 to the NVR system 140. The credential request 126 may optionally include the identifier associated with the security camera 130 to indicate that the dongle 120 is attempting to configure the security camera 130. The NVR system 140 may transmit the configuration credential 124 to the communication component 172 of the mobile device 110. Upon receiving the configuration credential 124, the communication component 172, in response to receiving the request, may transmit the configuration credential 124 to the dongle 120. In other aspects, the mobile device 110 may transmit the configuration credential 124 (stored locally) to the dongle 120 upon receiving the request (or the authentication request 122) without communicating with the NVR system 140.

In certain implementations, the configuration credential 124 may be hidden from an operator (i.e., the installer of the security camera 130) of the mobile device 110. The configuration credential 124, which may include login/password, public/private encryption keys, and/or secret codeword, may be relayed by the mobile device 110 without being disclosed to the operator of the mobile device 110. For example, the security camera 130 may include a private encryption key, and the NVR system 140 may include a public key corresponding to the private encryption key of the security camera 130. The NVR system 140 may encrypt the configuration credential 124 with the public key before transmitting the configuration credential 124 to the mobile device 110. The encrypted configuration credential 124 may not be used by the mobile device 110 and the dongle 120, but may be decrypted by the security camera 130 using the private key.

In some aspects, the communication component 162 of the dongle 120 may receive the configuration credential 124 from the communication component 172 of the mobile device 110. In other aspects, the configuration credential 124 may be stored in the memory 180 of the mobile device 110.

In certain aspects, the communication component 162 of the dongle 120 may transmit the configuration credential 124 to the communication component 192 of the security camera 130. In response to receiving the configuration credential 124, the authentication component 194 of the security camera 130 may determine whether the received configuration credential 124 allows the dongle 120 access to the security camera 130. For example, the communication component 162 of the dongle 120 may transmit an alpha-numeric string to the communication component 192 of the security camera 130. The authentication component 194 of the security camera 130 may use the private encryption key to decrypt the alpha-numeric string to produce a decrypted code-word. The authentication component 194 of the security camera 130 may compare the decrypted code-word with an internal code-word. If the decrypted code-word matches the internal code-word, the authentication component 194 may grant the dongle 120 access to configure the security camera 130 and/or permit the communication component 192 to transmit one or more video streams 102 to the dongle 120. If the decrypted code-word does not match the internal code-word, the authentication component 194 may not grant the dongle 120 access to configure the security camera 130 or permit the communication component 192 to transmit one or more video streams 102 to the dongle 120.

In certain examples, response to the authentication component 194 granting the dongle 120 access to configure the security camera 130, the communication component 192 of the security camera 130 may transmit the one or more video streams 102 to the dongle 120. The one or more video streams 102 may include images and videos captured by the security camera 130.

In some instances, the communication component 162 of the dongle 120 may receive the one or more video streams 102. The communication component 162 may transmit the received one or more video streams 102 to the communication component 172 of the mobile device 110.

In some implementations, the communication component 172 of the mobile device 110 may receive the one or more video streams 102 from the dongle 120. The GUI 186 of the application 182 may display the one or more video streams 102 on the display 112. The installer may rely on the one or more video streams 102 shown on the display 112 to configure the security camera 130. For example, the installer may input configuration commands 104 (e.g., zoom-in, zoom-out, tilt, pan, rotate, change resolution, change of focus, change light intensity, change contrast, etc.) into the GUI 186 to properly configure the security camera 130.

In certain aspects of the present disclosure, the communication component 172 may transmit the configuration commands 104 to the dongle 120. The communication component 162 of the dongle 120, in response to receiving the configuration commands 104, may transmit the configuration commands 104 to the communication component 192 of the security camera 130.

In an example implementation, in response to receiving the configuration commands 104, the configuration component 196 of the security camera 130 may configure the security camera based on the configuration commands 104. For example, the configuration component 196 of the security camera 130 may set the zoom depth, pan angle, mode of operation (explained in detail below), and/or other configuration settings of the security camera 130. In a non-limiting example, the configuration commands 104 may include configuration settings provided by the mobile device 110 to configure the security camera 130 to capture desired location(s), field size, resolution, etc. The security camera 130 may be automatically or manually configured by the configuration commands 104.

Figure 2:
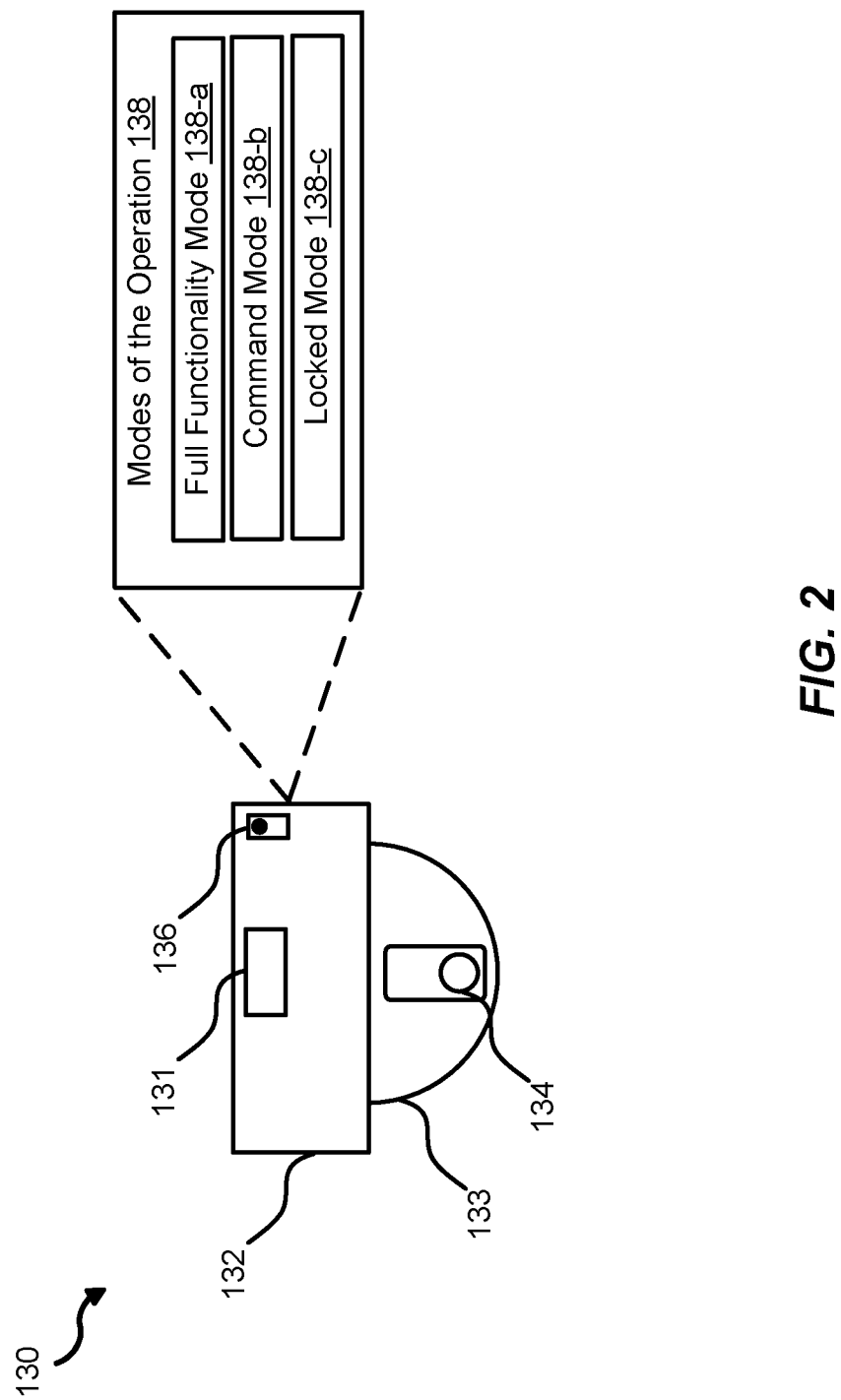
FIG. 2 illustrates an example of a security camera in accordance with aspects of the present disclosure.

Referring to FIG. 2 and still referencing FIG. 1, an example of the security camera 130 may include a base 132 for mounting on a surface, such as the surface of a ceiling or a wall in an infrastructure. The base 132 may be mounted to the surface via fasteners (e.g., screws, nails, bolts, rivets, anchors, staples, etc.), adhesive (e.g., single-sided tapes, double-sided tapes, glue, epoxy, cement, etc.), hooks (e.g., hooks, mountings, brackets, etc.) or any devices that couple the base 132 with the surface. The security camera 130 may include a dome 133 configured to rotate a lens 134. For example, the dome 133 may change the pan and/or tilt of the lens 134. The security camera 130 may include a switch 136. In one implementation, the switch 136 may be actuated to reset the configuration settings of the security camera 130. In another implementation, the switch 136 may be configured to toggle between a "unlocked" mode (allowing changes to the configuration settings) and an "locked" mode (forbidding changes to the configuration settings).

In an aspect of the present disclosure, the configuration component 196 of the security camera 130 may configure modes of operation 138 of the security camera 130. In one example, the security camera 130 may operate in a full functionality mode 138-*a*. The full functionality mode 138-*a* may prevent unauthorized access to the security camera 130. During the full functionality mode 138-*a*, the security camera 130 may transmit the one or more video streams 102, receive pre-programmed commands, and execute the received pre-programmed commands. For example, the NVR system 140 may transmit a first command to change the IP address of the security camera 130. In another example, the NVR system 140 may transmit a second command to change the receiving destination of the one or more video streams 102. In yet another example, the NVR system 140 may transmit a third command to reset the configuration settings of the security camera 130. The configuration component 196 of the security camera 130 may execute the first, second, and third commands when the security camera 130 is in the full functionality mode 138-*a*.

In an implementation, the security camera 130 may operate in a command mode 138-*b*. The command mode 138-*b* may provide limited control to the NVR system 140 while preventing unauthorized access to the security camera 130. In the command mode 138-*b*, the security camera 130 may transmit the one or more video streams 102, receive a subset of the pre-programmed commands, and execute the subset of the pre-programmed commands. Examples of the subset of pre-programmed commands (plus input values) may include Lens Focus (select area to focus on, initiate one touch focus operation, manually focus near, manually focus far), Infrared Mode (day, night, auto), Dynamic Range Mode (true wide dynamic range (WDR), digital WDR, none), Exposure Offset (brighter by one f stop, darker by one f stop, ignore bright spots, emphasize bright spots, auto), P-Iris (large depth of field, fastest lens for motion), Compression Quality (highest, high, medium, low, lowest, auto), Record Snapshot to SD card (on, off), White Balance (normal, wide range, one touch, off), and/or Zoom (in, out). The commands and the number of commands in the subset of the pre-programmed commands may be determined by the NVR system 140 (and the network administrator). For example, the NVR system 140 may transmit a fourth command to change the Lens Focus of the security camera 130 (from manually focus near to initiate one touch focus operation). In another example, the NVR system 140 may transmit a fifth command to reset the configuration credential of the security camera 130. Since the security camera 130 is in the command mode, the configuration component 196 of the security camera 130 may execute the fourth command, but not the fifth because the reset command is not in the subset of the pre-programmed commands.

In certain examples, the security camera 130 may operate in a locked mode 138-*c*. In the locked mode 138-*c*, the security camera 130 may transmit the one or move video streams 102 and not receive any command. For example, the security camera 130 may not execute any command transmitted by the NVR system 140. The locked mode 138-*c* may prevent unauthorized access to the security camera 130.

Figure 3:
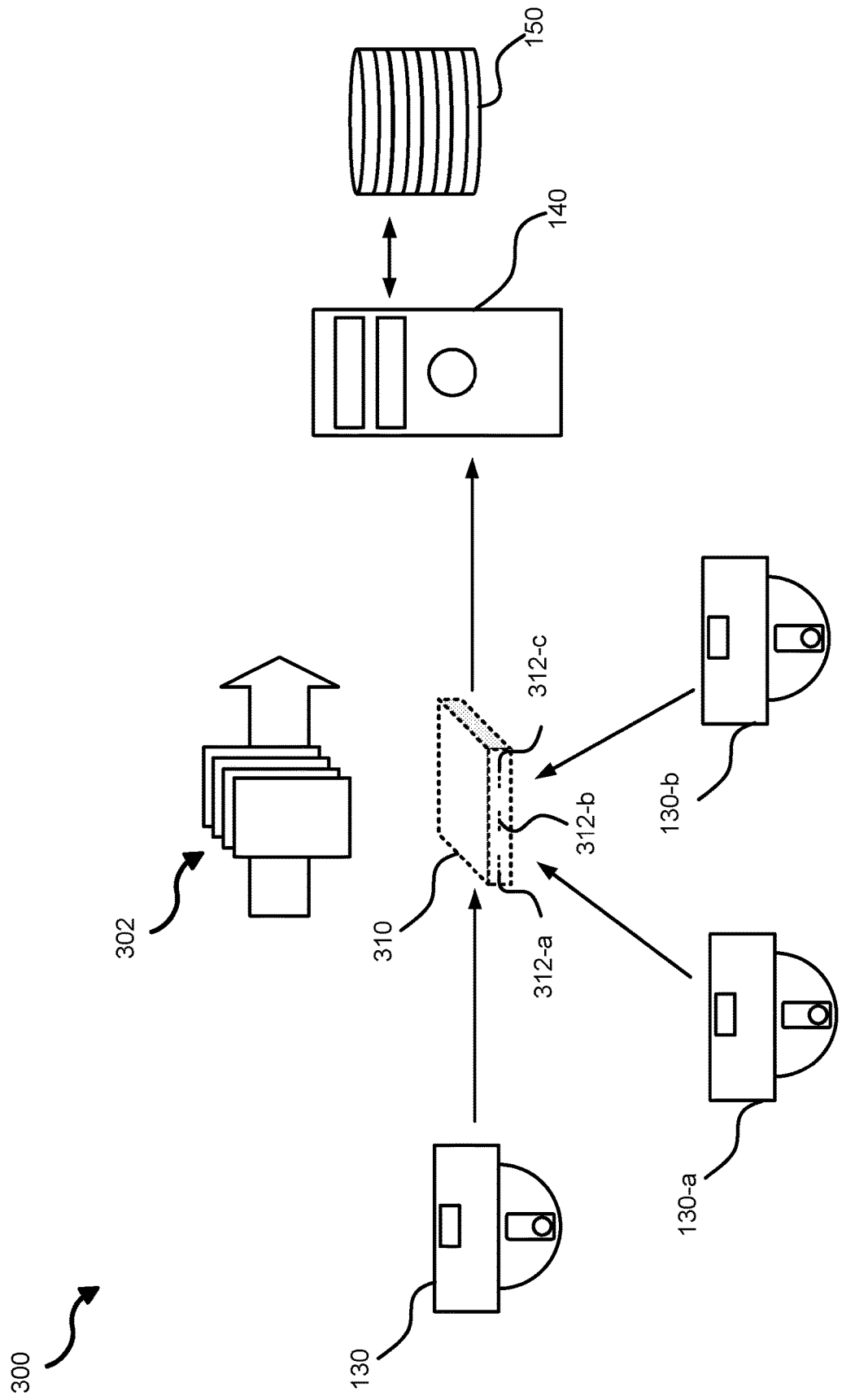
FIG. 3 illustrates an example of an environment for operating one or more security cameras in accordance with aspects of the present disclosure.

Turning now to FIG. 3, in some implementations, in an example environment 300 for transmitting video streams, the security camera 130 may push one or more security video streams 302 to the NVR system 140. In one non-limiting example, the one or more security video streams 302 may include images and/or videos of an area being monitored by the security camera 130. The security camera 130 may push the one or more security video streams 302 without input from the NVR system 140. The security camera 130 may communicate with the NVR system 140 via standard interfaces and/or protocols such as Open Network Video Interface Forum (ONVIF), Hypertext Transfer Protocol (HTTP), or HTTP Secure (HTTPS), or other proprietary interfaces and/or protocols. Certain technologies that may allow the security camera 130 to push the one or more security video streams 302 while blocking reception of commands may include real-time protocol (RTP) or real time streaming protocol (RTSP) Push, multicast or single cast to fixed IP address, or physical port identification. In one implementation, the security camera 130 may push the one or more security video streams 302 to the NVR system 140 via an optional switch 310.

In some implementations, the one or more security video streams 302 may be encrypted prior to transmitting to the NVR system 140. For example, the security camera 130 may encrypt the one or more security video streams 302 using a hash function, asymmetric key encryption, AES video encryption, or other encryption and/or scrambling methods.

In certain examples, the one or more security video streams 302 may be compressed prior to transmitting to the NVR system 140. The security camera 130 may use lossy or lossless compression techniques, such as transform coding, Dirac compression, Moving Picture Experts Group (MPEG) compression (e.g., MPEG-1, MPEG-2, MPEG-4, etc.), Ogg Theora, H.264, H.265, VP9, or other compression algorithms.

In an aspect of the present disclosure, the security camera 130, a second security camera 130-*b*, and a third security camera 130-*c* may be coupled with the optional switch 310. The optional switch 310 may be coupled with the NVR system 140. The security camera 130 may be coupled with a first port 312-*a* of the optional switch 310. The second security camera 130-*b* may be coupled with a second port 312-*b* of the optional switch 310. The third security camera 130 may be coupled with a third port 312-*c* of the optional switch 310. In one implementation, the optional switch 310 may associate data (video streams) received at the first, second, or third port 312-*a*, 312-*b*, 312-*c* with the security camera 130, 130-*b*, 130-*c*, respectively, and transmit the data (labeled) to the NVR system 140. For example, the optional switch 310 may assign a first digital label ("Camera 1") to the data received at the first port 312-*a*, a second digital label ("Camera 2") to the data received at the second port 312-*b*, and a third digital label ("Camera 3") to the data received at the third port 312-*c*. The assignment of the labels may include adding unique identifiers to the data to identify the source (e.g., the security cameras 130, 130-*b*, 130-*c*) of the data. The optional switch 310 may transmit the labeled data (associated with "Camera 1," "Camera 2," and "Camera 3") to the NVR system 140. The NVR system 140 may display the video streams in the data in three separate views associated with Camera 1, Camera 2, and Camera 3. In other implementations, the security cameras 130, 130-*b*, 130-*c* may each include an unique identifier (e.g., physical IP address, virtual IP address, media access control (MAC) address, serial number, etc.). When sending data, such as the one or more security video streams 302, each of the security cameras 130, 130-*b*, 130-*c* may append its unique identifier with the data. The NVR system 140, upon receiving the data (directly or via the optional switch 310), may display the video streams in the data separately based on the appended unique identifiers.

Figure 4:
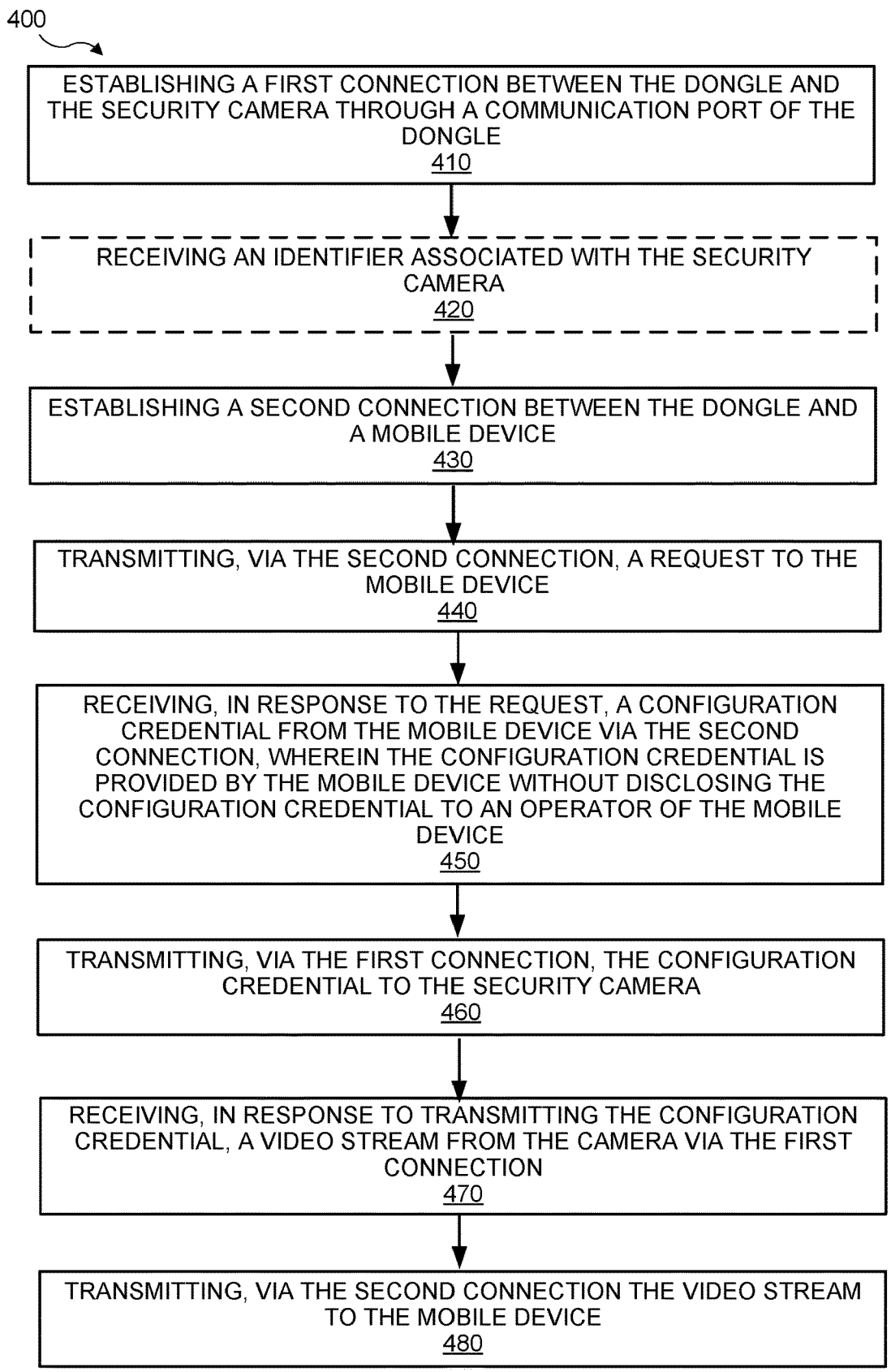
FIG. 4 illustrates an example of a method for configuring a security camera in accordance with aspects of the present disclosure.

Referring to FIG. 4, an example of a method 400 for configuring a security camera may be performed by the microprocessor 160, the communication component 162, and/or the connection component 164 of the dongle 120.

At block 410, the method 400 may establish a first connection with a security camera through a communication port of the dongle. For example, the communication component 162 may be coupled with the security camera 130 via the port 131 after the dongle 120 is coupled with the security camera 130.

At block 420, the method 400 may optionally receive an identifier associated with the camera. For example, the communication component 162 may receive the unique identifier (e.g., physical/virtual IP address, MAC address) of the security camera 130 via the port 131.

At block 430, the method 400 may establish a second connection with a mobile device. For example, the communication component 162 may receive a pairing request from the communication component 172 of the mobile device 110. The communication component 162 may accept the pairing request so the dongle 120 is paired (e.g., via RFID, NFC) with the mobile device 110. After the pairing, the communication component 162 may receive connection configuration information from the mobile device 110. The connection component 164 may configure the wireless communication configurations of the dongle 120 to establish a wireless communication connection (e.g., WiFi, WiFi direct, etc.). In alternative implementations, the communication component 162 may be coupled with (e.g., RFID, NFC, WiFi, WiFi direct) to the mobile device 110 using configuration information stored therein.

At block 440, the method 400 may transmit a request to the mobile device via the second connection. For example, the communication component 162 may transmit the authentication request 122 to the mobile device 110. The authentication request 122 may optionally include the identifier associated with the security camera 130. In alternative implementations, the communication component 162 may transmit a request to the mobile device 110 that does not require authentication.

At block 450, the method 400 may receive, in response to the request, a configuration credential from the mobile device via the second connection, wherein the configuration credential is provided by the mobile device without disclosing the configuration credential to an operator of the mobile device. For example, the communication component 162 may receive, in response to the authentication request 122, the configuration credential 124 from the communication component 172 of the mobile device 110. In alternative implementations, the communication component 162 may receive, in response to the request, the configuration credential 124 from the mobile device 110. The configuration credential 124 may be withheld from the installer.

At block 460, the method 400 may transmit the configuration credential to the security camera. For example, the communication component 162 of the dongle 120 may transmit the configuration credential 124 to the security camera 130.

At block 470, the method 400 may receive, in response to providing the configuration credential, a video stream from the security camera via the first connection. For example, the communication component 162 of the dongle 120 may receive the one or more video streams 102 from the security camera 130 in response to transmitting the configuration credential 124.

At block 480, the method 400 may transmit the video stream to the mobile device. For example, the communication component 162 of the dongle 120 may relay the one or more video streams 102 received from the security camera 130 to the mobile device 110.

Figure 5:
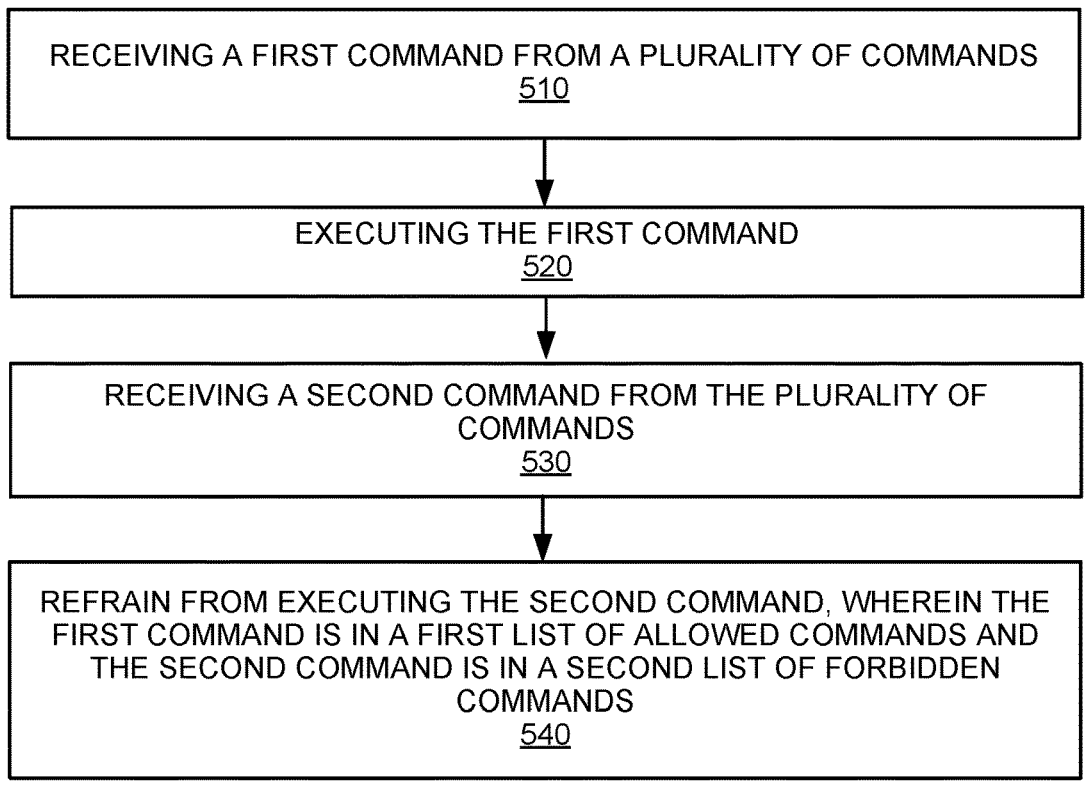
FIG. 5 illustrates an example of a method for operating a security camera in command mode in accordance with aspects of the present disclosure.

Referring to FIG. 5, a method 500 of operating a camera in the command mode 138-b may be performed by the microprocessor 190 of the security camera 130. Examples of the allowed commands in the command mode 138-b may include Lens Focus (select area to focus on, initiate one touch focus operation, manually focus near, manually focus far), Infrared Mode (day, night, auto), Dynamic Range Mode (true wide dynamic range (WDR), digital WDR, none), Exposure Offset (brighter by one f stop, darker by one f stop, ignore bright spots, emphasize bright spots, auto), P-Iris (large depth of field, fastest lens for motion), Compression quality (highest, high, medium, low, lowest, auto), Record Snapshot to SD card (on, off), White Balance (normal, wide range, one touch, off), and/or Zoom (in, out). The commands and the number of commands in the subset of the pre-programmed commands may be determined by the NVR system 140 (and the network administrator).

At block 510, the method 500 may receive a first command from a plurality of commands. For example, the communication component 192 of the security camera 130 may receive the Infrared Mode command ("on").

At block 520, the method 500 may execute the first command. For example, the microprocessor 190 of the security camera 130 may execute the Infrared Mode command and activate the infrared feature.

At block 530, the method 500 may receive a second command from a plurality of commands. For example, the communication component 192 of the security camera 130 may receive the Reset Configuration Credential command.

At block 540, the method 500 may refrain from executing the second command, wherein the first command is in a first list of allowed commands and the second command is in a second list of forbidden commands. For example, the microprocessor 190 of the security camera 130 may refrain from executing the Reset Configuration Credential command because the security camera 130 is operating in the command mode 138-b and the Reset Configuration Credential command is not part of the allowed commands.

Figure 6:
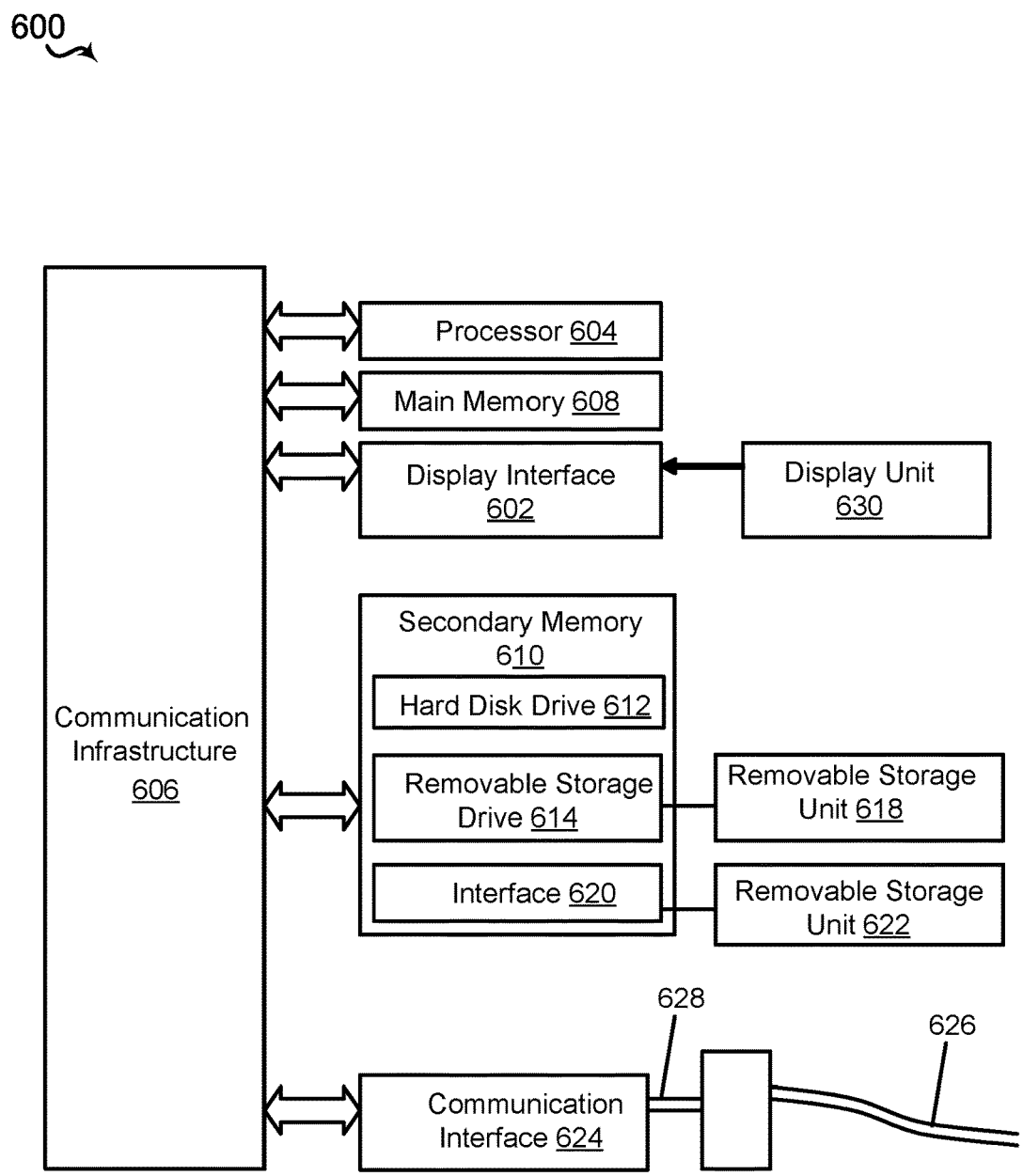
FIG. 6 illustrates an example of a computer system in accordance with aspects of the present disclosure.

Aspects of the present disclosures, such as the mobile device 110, the dongle 120, the security camera 130, NVR system 140 and/or the optional switch 310 may be implemented using hardware, software, or a combination thereof and may be implemented in one or more computer systems or other processing systems. In an aspect of the present disclosures, features are directed toward one or more computer systems capable of carrying out the functionality described herein. An example of such a computer system 600 is shown in FIG. 6. The mobile device 110, the dongle 120, the security camera 130, NVR system 140 and/or the optional switch 310 may include some or all of the components of the computer system 1200.

The computer system 600 includes one or more processors, such as processor 604. The processor 604 is connected with a communication infrastructure 606 (e.g., a communications bus, cross-over bar, or network). The term "bus," as used herein, can refer to an interconnected architecture that is operably connected to transfer data between computer components within a singular or multiple systems. The bus can be a memory bus, a memory controller, a peripheral bus, an external bus, a crossbar switch, and/or a local bus, among others. Various software aspects are described in terms of this example computer system. After reading this description, it will become apparent to a person skilled in the relevant art(s) how to implement aspects of the disclosures using other computer systems and/or architectures.

The computer system 600 may include a display interface 602 that forwards graphics, text, and other data from the communication infrastructure 606 (or from a frame buffer not shown) for display on a display unit 630. Computer system 600 also includes a main memory 608, preferably random access memory (RAM), and may also include a secondary memory 610. The secondary memory 610 may include, for example, a hard disk drive 612, and/or a removable storage drive 614, representing a floppy disk drive, a magnetic tape drive, an optical disk drive, a universal serial bus (USB) flash drive, etc. The removable storage drive 614 reads from and/or writes to a removable storage unit 618 in a well-known manner. Removable storage unit 618 represents a floppy disk, magnetic tape, optical disk, USB flash drive etc., which is read by and written to removable storage drive 614. As will be appreciated, the removable storage unit 618 includes a computer usable storage medium having stored therein computer software and/or data. In some examples, one or more of the main memory 608, the secondary memory 610, the removable storage unit 618, and/or the removable storage unit 622 may be a non-transitory memory.

Alternative aspects of the present disclosures may include secondary memory 610 and may include other similar devices for allowing computer programs or other instructions to be loaded into computer system 600. Such devices may include, for example, a removable storage unit 622 and an interface 620. Examples of such may include a program cartridge and cartridge interface (such as that found in video game devices), a removable memory chip (such as an erasable programmable read only memory (EPROM), or programmable read only memory (PROM)) and associated socket, and other removable storage units 622 and interfaces 620, which allow software and data to be transferred from the removable storage unit 622 to computer system 600.

Computer system 600 may also include a communications interface 624. Communications interface 624 allows software and data to be transferred between computer system 600 and external devices. Examples of communications interface 624 may include a modem, a network interface (such as an Ethernet card), a communications port, a Personal Computer Memory Card International Association (PCMCIA) slot and card, etc. Software and data transferred via communications interface 624 are in the form of signals 628, which may be electronic, electromagnetic, optical or other signals capable of being received by communications interface 624. These signals 628 are provided to communications interface 624 via a communications path (e.g., channel) 626. This path 626 carries signals 628 and may be implemented using wire or cable, fiber optics, a telephone line, a cellular link, an RF link and/or other communications channels. In this document, the terms "computer program medium" and "computer usable medium" are used to refer generally to media such as a removable storage drive 618, a hard disk installed in hard disk drive 612, and signals 628. These computer program products provide software to the computer system 600. Aspects of the present disclosures are directed to such computer program products.

Computer programs (also referred to as computer control logic) are stored in main memory 608 and/or secondary memory 610. Computer programs may also be received via communications interface 624. Such computer programs, when executed, enable the computer system 600 to perform the features in accordance with aspects of the present disclosures, as discussed herein. In particular, the computer programs, when executed, enable the processor 604 to perform the features in accordance with aspects of the present disclosures. Accordingly, such computer programs represent controllers of the computer system 600.

In an aspect of the present disclosures where the method is implemented using software, the software may be stored in a computer program product and loaded into computer system 600 using removable storage drive 614, hard drive 612, or communications interface 620. The control logic (software), when executed by the processor 604, causes the processor 604 to perform the functions described herein. In another aspect of the present disclosures, the system is implemented primarily in hardware using, for example, hardware components, such as application specific integrated circuits (ASICs). Implementation of the hardware state machine so as to perform the functions described herein will be apparent to persons skilled in the relevant art(s).

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method of configuring a security camera using a dongle, comprising:
   establishing a first connection between the dongle and the security camera through a communication port of the dongle;
   establishing a second connection between the dongle and a mobile device;
   transmitting a request to the mobile device via the second connection;
   receiving, in response to the request, a configuration credential from the mobile device via the second connection, wherein the configuration credential is provided by the mobile device without disclosing the configuration credential to an operator of the mobile device;
   transmitting, via the first connection, the configuration credential to the security camera;
   receiving, in response to providing the configuration credential, a video stream from the security camera via the first connection; and
   transmitting, via the second connection, the video stream to the mobile device to display the video stream to the operator via the mobile device.

2. The method of claim 1, further comprises receiving, in response to transmitting the video stream, one or more configuration commands from the mobile device via the second connection.

3. The method of claim 2, further comprises transmitting, in response to receiving the one or more configuration commands, the one or more configuration commands to the security camera via the first connection.

4. The method of claim 1, further comprises:
   receiving an identifier associated with the security camera from the security camera via the first connection; and
   appending the identifier to the request prior to transmitting the request.

5. The method of claim 1, wherein establishing the second connection further comprises:
   receiving a pairing request from the mobile device;
   establishing a near-field communication (NFC) connection with the mobile device;
   receiving connection configuration information via the NFC connection; and
   configuring a wireless fidelity (WiFi) connection using the connection configuration information.

6. The method of claim 1, wherein the configuration credential includes at least one of a login, a password, a public encryption key, or a code-word.

7. The method of claim 1, wherein the request includes an authentication request.

8. A dongle, comprising:
   a memory; and
   a processor communicatively coupled with the memory, the processor being configured to:
      establish a first connection between the dongle and a security camera through a communication port of the dongle;
      establish a second connection between the dongle and a mobile device;
      transmit a request to the mobile device via the second connection;
      receive, in response to the request, a configuration credential from the mobile device via the second connection, wherein the configuration credential is provided by the mobile device without disclosing the configuration credential to an operator of the mobile device;
      transmit, via the first connection, the configuration credential to the security camera;
      receive, in response to providing the configuration credential, a video stream from the security camera via the first connection; and
      transmit, via the second connection, the video stream to the mobile device to display the video stream to the operator via the mobile device.

9. The dongle of claim 8, wherein the processor is further configured to receive, in response to transmitting the video stream, one or more configuration commands from the mobile device via the second connection.

10. The dongle of claim 9, wherein the processor is further configured to transmit, in response to receiving the one or more configuration commands, the one or more configuration commands to the security camera via the first connection.

11. The dongle of claim 8, wherein the processor is further configured to:
   receive an identifier associated with the security camera from the security camera via the first connection; and
   append the identifier to the request prior to transmitting the request.

12. The dongle of claim 8, wherein establishing the second connection further comprises:
   receiving a pairing request from the mobile device;

establishing a near-field communication (NFC) connection with the mobile device;
receiving connection configuration information via the NFC connection; and
configuring a wireless fidelity (WiFi) connection using the connection configuration information.

13. The dongle of claim 8, wherein the configuration credential includes at least one of a login, a password, a public encryption key, or a code-word.

14. The dongle of claim 8, wherein the request includes an authentication request.

15. A non-transitory computer readable medium having instructions stored therein that, when executed by a processor of a dongle, cause the processor to:
   establish a first connection between the dongle and a security camera through a communication port of the dongle;
   establish a second connection between the dongle and a mobile device;
   transmit a request to the mobile device via the second connection;
   receive, in response to the request, a configuration credential from the mobile device via the second connection, wherein the configuration credential is provided by the mobile device without disclosing the configuration credential to an operator of the mobile device;
   transmit, via the first connection, the configuration credential to the security camera;
   receive, in response to providing the configuration credential, a video stream from the security camera via the first connection; and
   transmit, via the second connection, the video stream to the mobile device to display the video stream to the operator via the mobile device.

16. The non-transitory computer readable medium of claim 15, further comprise instructions that, when executed by the processor, cause the processor to receive, in response to transmitting the video stream, one or more configuration commands from the mobile device via the second connection.

17. The non-transitory computer readable medium of claim 16, further comprise instructions that, when executed by the processor, cause the processor to transmit, in response to receiving the one or more configuration commands, the one or more configuration commands to the security camera via the first connection.

18. The non-transitory computer readable medium of claim 15, further comprise instructions that, when executed by the processor, cause the processor to:
   receive an identifier associated with the security camera from the security camera via the first connection; and
   append the identifier to the request prior to transmitting the request.

19. The non-transitory computer readable medium of claim 15, wherein the instructions for establishing the second connection further comprises instructions that, when executed by the processor, cause the processor to:
   receive a pairing request from the mobile device;
   establish a near-field communication (NFC) connection with the mobile device;
   receive connection configuration information via the NFC connection; and
   configure a wireless fidelity (WiFi) connection using the connection configuration information.

20. The non-transitory computer readable medium of claim 15, wherein the configuration credential includes at least one of a login, a password, a public encryption key, or a code-word.

* * * * *